United States Patent
DiCicco et al.

(10) Patent No.: US 12,042,759 B2
(45) Date of Patent: Jul. 23, 2024

(54) FILTER CONDITIONING UNIT FOR HIGH-VOLUME SAMPLING FILTERS

(71) Applicants: Signature Science, LLC, Charlottesville, VA (US); Government of the United States of America, as represented by the Secretary of Homeland Security, Washington, DC (US)

(72) Inventors: Joseph A. DiCicco, Cape May Court House, NJ (US); Paul M. Flanigan, IV, Marlton, NJ (US); John Brady, Medford, NJ (US); Barry Smith, Egg Harbor City, NJ (US)

(73) Assignees: Signature Science, LLC, Charlottesville, VA (US); Government of the United States of America, as represented by the Secretary of Homeland Security, Washington, DC (US)

( * ) Notice: Subject to any disclaimer, the term of this patent is extended or adjusted under 35 U.S.C. 154(b) by 527 days.

(21) Appl. No.: 17/395,138

(22) Filed: Aug. 5, 2021

(65) Prior Publication Data
US 2022/0040621 A1    Feb. 10, 2022

Related U.S. Application Data

(60) Provisional application No. 63/062,078, filed on Aug. 6, 2020.

(51) Int. Cl.
*B01D 46/84* (2022.01)
*B01D 46/00* (2022.01)
*B01D 46/42* (2006.01)
*B01D 46/44* (2006.01)
*B01D 53/14* (2006.01)
*B01D 53/26* (2006.01)

(52) U.S. Cl.
CPC ......... *B01D 46/84* (2022.01); *B01D 46/0009* (2013.01); *B01D 46/4227* (2013.01); *B01D 46/44* (2013.01); *B01D 53/14* (2013.01); *B01D 53/26* (2013.01); *B01D 2271/02* (2013.01)

(58) Field of Classification Search
CPC ............... B01D 46/84; B01D 46/0009; B01D 46/4227; B01D 46/0006; B01D 2259/40086; B01D 2259/40088; B01D 53/14; B01D 53/26; B01D 2271/02
See application file for complete search history.

(56) References Cited

U.S. PATENT DOCUMENTS

| | | | | |
|---|---|---|---|---|
| 2004/0020177 A1* | 2/2004 | Ota | ........................ | B01D 46/88 55/506 |
| 2021/0095889 A1* | 4/2021 | Park | ....................... | B01D 46/10 |

* cited by examiner

*Primary Examiner* — Robert Clemente
(74) *Attorney, Agent, or Firm* — Ballard Spahr LLP (57) ABSTRACT

Disclosed is a filter conditioning unit for cleaning and conditioning high-volume sampling (HVS) filters. The unit includes, among other elements, a filter tray suitable for holding one or more HVS filters, a manifold in which the filter tray is inserted, and an optional enclosure for safety. The manifold is suitable for heating the filter tray and filters therein to a desired temperature while purge gas is introduced to the manifold. Also described herein is a method of using the filter conditioning unit.

19 Claims, 7 Drawing Sheets

FILTER CONDITIONING UNIT FOR HIGH-VOLUME SAMPLING FILTERS

CROSS-REFERENCE TO RELATED APPLICATION

This application claims priority to and the benefit of the filing date of U.S. Provisional Patent Application No. 63/062,078, filed Aug. 6, 2020, the entirety of which is hereby incorporated by reference herein.

FIELD

This application relates generally to a filter conditioning unit for conditioning one or more filters suitable for use with high-volume sampling (HVS) and methods for using the conditioning unit.

BACKGROUND

Sampling and detection methodologies are currently being developed by a variety of researchers to detect contraband material. The detection of contraband material is challenging because of the possible number of signature molecules, their wide range of chemical structures, and their vast range of vapor pressures. Storing contraband materials in enclosed spaces may allow for a buildup of the vapor pressure for that material, which may enable chemical identification of the vapor inside the container if sampled and analyzed.

However, the identification of contraband material becomes increasingly difficult in an asymmetric threat scenario because of the size of the containers that may be concealing targets, the presence of interferents from the cargo or previous fumigation of the containers, and operational constraints, which require high throughput. In addition, identification is only further complicated as a majority of contraband materials have a very low vapor pressure, which provides only trace amounts of the material in the vapor phase for identification. Any vapor that may be produced tends to adsorb onto or adhere to surfaces within the container.

In addition to the aforementioned complications associated with vapor sampling of contraband materials, vapor screening of large transport systems presents another difficulty. Thus, most systems used for vapor screening of these containers have utilized high volume sampling (HVS) systems to sample larger volumes of air and pass the sampled air to special pre-concentrator filters to capture contraband vapors for subsequent analysis and identification. Prior to utilizing filter media in HVS systems, the filters must be cleaned and conditioned to ensure that the material is prepared for capturing vapor and that contamination from previous uses is eliminated. There is currently a need in the art for a unit capable of adequately cleaning and conditioning one or more HVS filters. This need and others are met by the following disclosure.

SUMMARY

Disclosed herein, in one aspect, is a filter conditioning unit suitable for cleaning and conditioning one or more HVS filters. According to one aspect, the filter conditioning unit comprises a filter tray having a first portion that defines a plurality of cavities extending therethrough. Each cavity of the filter tray can be configured to receive and support one or more filters.

The filter conditioning unit can also comprise a manifold defining an opening configured to receive the first portion of the filter tray. The manifold can further define a plurality of holes, each of which can be configured to receive a gas or exhaust line. The plurality of holes of the manifold can be aligned with a respective cavity of the plurality of cavities of the filter tray when the tray is received within the manifold. The manifold can further comprise one or more cavities configured to receive a heater cartridge.

Also disclosed herein, in a further aspect, is a method of using the filter conditioning unit to clean and condition one or more HVS filters.

In one aspect, a filter conditioning unit comprises a filter tray defining a plurality of cavities extending therethrough, each cavity being configured to receive and support one or more filters. A manifold can define an opening configured to receive at least a portion of the filter tray. The manifold can further define a plurality of inlet holes each configured to receive a gas source and a plurality of outlet holes each configured to receive an exhaust line. Each of the plurality of inlet holes and outlet holes can be aligned with a respective cavity of the plurality of cavities of the filter tray when the tray is received within the manifold. The manifold can further comprise one or more cavities configured to receive a heating element.

In one aspect, a filter conditioning unit system can comprise a gas source and a filter conditioning unit. A respective heating element can be disposed within each cavity of the manifold.

In one aspect, a method can comprise positioning at least one filter into each cavity of a plurality of cavities of a filter tray, wherein each cavity of the plurality of cavities extends through the filter tray. The method can further comprise positioning the filter tray at least partially within an opening of a manifold so that each of a plurality of inlet holes and a plurality of outlet holes of the manifold are aligned with a respective cavity of the plurality of cavities of the filter tray. The manifold can further defines one or more cavities. A heating element can be disposed within each cavity of the manifold.

Additional advantages of the disclosed filter conditioning unit and method will be set forth in part in the description which follows, and in part will be understood from the description, or may be learned by practice of the disclosed unit and method. The advantages of the disclosed unit and method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed filter conditioning unit and method and together with the description, serve to explain the principles of the disclosed unit and method.

FIGS. 2A-B depict an exemplary embodiment of a manifold.

DETAILED DESCRIPTION

The disclosed filter conditioning unit and method may be understood more readily by reference to the following detailed description of particular embodiments and the examples included therein and to the Figures and their previous and following description.

A. Definitions

It is to be understood that the terminology used herein is for the purpose of describing particular embodiments only, and is not intended to limit the scope of the present invention which will be limited only by the appended claims.

It must be noted that as used herein and in the appended claims, the singular forms "a," "an," and "the" include plural references unless the context clearly dictates otherwise. Thus, for example, reference to "a cavity" includes a plurality of such cavities, and reference to "the cavity" is a reference to one or cavities and equivalents thereof known to those skilled in the art, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed appliance and method belong. Although any filter conditioning unit and method similar or equivalent to those described herein can be used in the practice or testing of the present unit and method, the particularly useful units and methods are as described.

Throughout the description and claims of this specification, the word "comprise" and variations of the word, such as "comprising" and "comprises," means "including but not limited to," and is not intended to exclude, for example, other elements, components, integers or steps. In particular, in methods stated as comprising one or more steps or operations, it is specifically contemplated that each step comprises what is listed (unless that step includes a limiting term such as "consisting of"), meaning that each step is not intended to exclude, for example, other elements, components, integers or steps that are not listed in the step.

B. Filter Tray

Disclosed herein is a filter conditioning unit for cleaning and conditioning one or more HVS filters that can include, among other elements, a filter tray. According to one aspect, the filter tray can be designed to clean and condition multiple HVS filters at the same time. The tray can be durable enough for repeated conditionings of multiple HVS filters.

Figure 1:
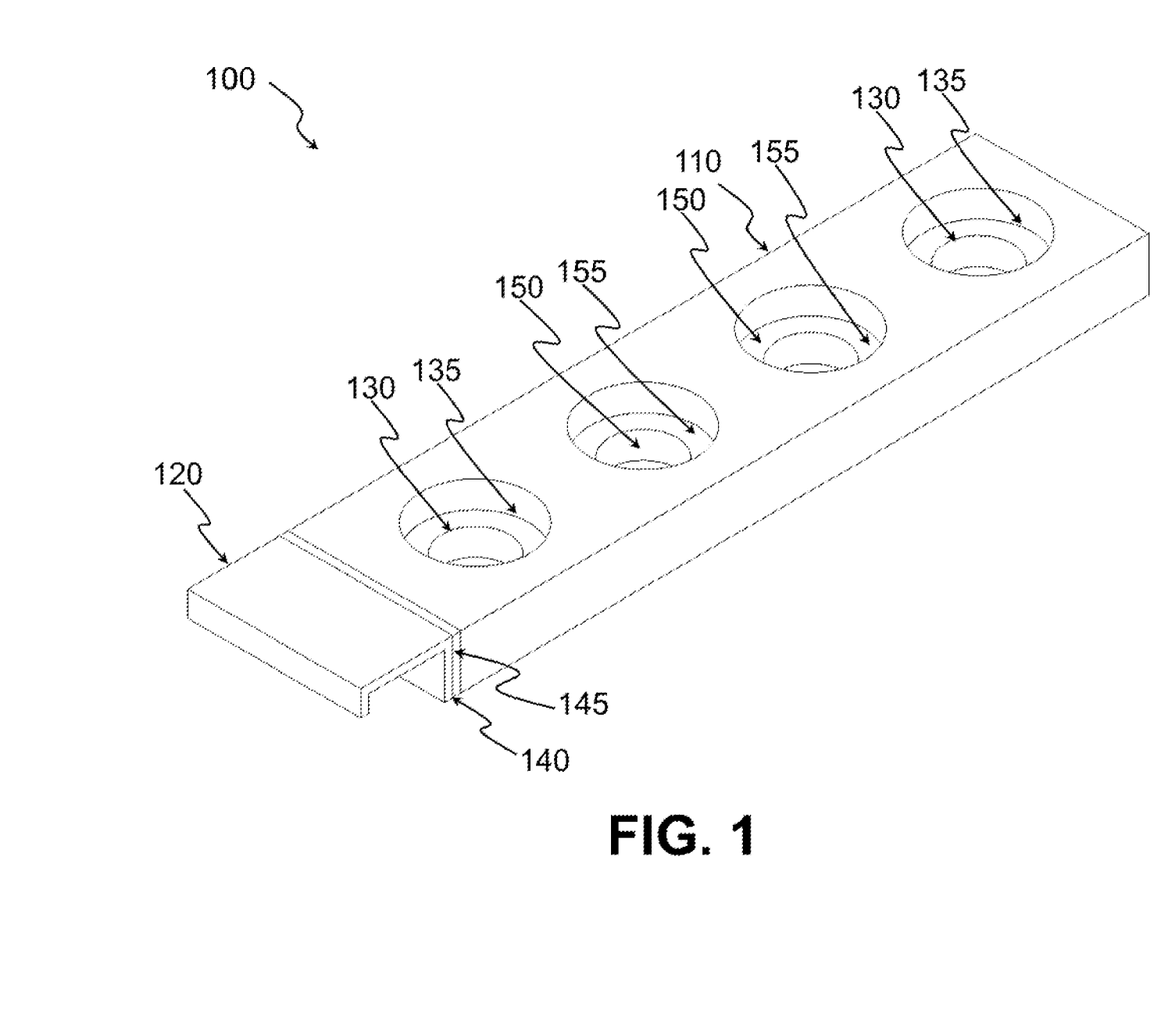
FIG. 1 depicts an exemplary embodiment of a filter tray as disclosed herein.

An exemplary embodiment of the filter tray is depicted in FIG. 1. According to one aspect, as shown in FIG. 1, filter tray 100 can comprise a first portion 110 that defines a plurality of cavities 130 extending therethrough. The cavities 130 can be configured to receive and support one or more HVS filters. In some aspects, each cavity 130 can comprise a through-bore 150 that extends through the tray 100 and a recess 135 that extends through only a portion of a thickness of the tray from a top surface 160 so that the recess 135 defines a lip 155 that is suitable for supporting one or more filters. Optionally, for example, the recess 135 can be defined by a counterbore that surrounds the through-bore 150.

According to one aspect, cavities 130 can have dimensions suitable for receiving the filter media. For example, optionally, the recess 135 can be cylindrical. In further aspects, the recesses can be square, oblong, rectangular, or any suitable shape. The dimensions of recesses 135 can be selected to accommodate the overall dimensions (e.g., diameter) of the filter. For example, recessed portions 135 can have a diameter from about 1 inch to about 2 inches (e.g., about 1.55 inch diameters). It is contemplated that, for a circular filter media having a diameter, the recesses 135 can have a greater diameter than the filter media to allow the filter media to lie flat on the lip 155, and the through-bore 140 can have a diameter that is less than the filter media so that the filter media cannot fall through the through-bore. In some aspects, the recess 135 can have a depth that is sufficient to receive up to eight filters, depending on the material thickness of each filter and filter media. For example, the recess 135 can have a depth of at least ⅛ inch, about ½ inch, or from about ¼ inch to about one inch. Thus, when filter tray 100 comprises four cavities 130, the filter tray can hold up to 32 filters. Accordingly, such an embodiment can enable simultaneous cleaning and conditioning of all 32 filters. Although the exemplary filter tray 100 depicted in FIG. 1 comprises four cavities 130, any suitable number of cavities in the filter tray is contemplated such as, for example, 1, 2, 3, 5, 6, 7, 8, 9, 10, or more cavities. Further, each cavity can be configured to receive, for example, 1, 2, 3, 5, 6, 7, 8, 9, 10, or more filters with all filters positioned below the top surface 160.

Filter tray 100 can be made from a material suitable for withstanding temperatures required to clean and condition HVS filters (e.g., at least 150° F., at least 200° F., at least 300° F., or at least 400° F. According to one aspect, filter tray 100 can be machined out of a suitable aluminum or aluminium alloy material (e.g., aluminum 6061). Aluminum 6061, for example, is a precipitation-hardened aluminum alloy, containing magnesium and silicon as its major alloying elements. This alloy has good mechanical properties, exhibits good weldability, and can withstand temperatures suitable for cleaning and conditioning HVS filters. Other suitable materials, such as stainless steel (e.g., 304L or 316 stainless steel), are also contemplated.

Filter tray 100 can also comprise a second portion 120. Optionally, as shown in FIG. 1, the second portion 120 can be secured to or integrally formed with an end of the first portion 110, and the second portion can extend outwardly from the end of the first portion. Second portion 120 can comprise a handle suitable for removing the tray from a manifold (further disclosed herein). When filter tray 100 is inserted into the manifold, portion 120 can protrude from the manifold opening such that portion 120 does not become as heated during conditioning as portion 110. While portion 120 is not directly heated, portion 120 may become hot during use of the filter conditioning unit. Optionally, portion 120 can comprise an insulator on one or more surfaces thereof to reduce the temperature of portion 120 and increase user safety.

According to one aspect, second portion 120 can further comprise a groove 140 (e.g., a circumferential groove) configured to receive a gasket 145 suitable for creating an air-tight seal within the manifold. In one aspect, for example, groove 140 can receive a gasket (optionally, a gasket comprising KALREZ material) that can create a suitable seal between the manifold and the filter tray 100. In various aspects, the groove 140 can extend circumferentially around the filter tray 100, and the gasket 145 can be a shaped to fit over an end of the filter tray to be received within the groove. Other gaskets and sealing elements and mechanisms suited for high-temperature applications are also contemplated. As shown in FIG. 1, the groove 140 can be positioned at the junction between the first and second portions 110, 120.

C. Manifold

The manifold of the filter conditioning unit can be designed to receive the filter tray comprising one or more HVS filters. The manifold generally comprises holes that can align with the cavities of the filter tray when the tray is inserted into the manifold. The holes of the manifold are suitable for passing a purge gas through the filter tray cavities comprising the HVS filters, which can clean and condition the filters at a suitable temperature.

Figure 2A:
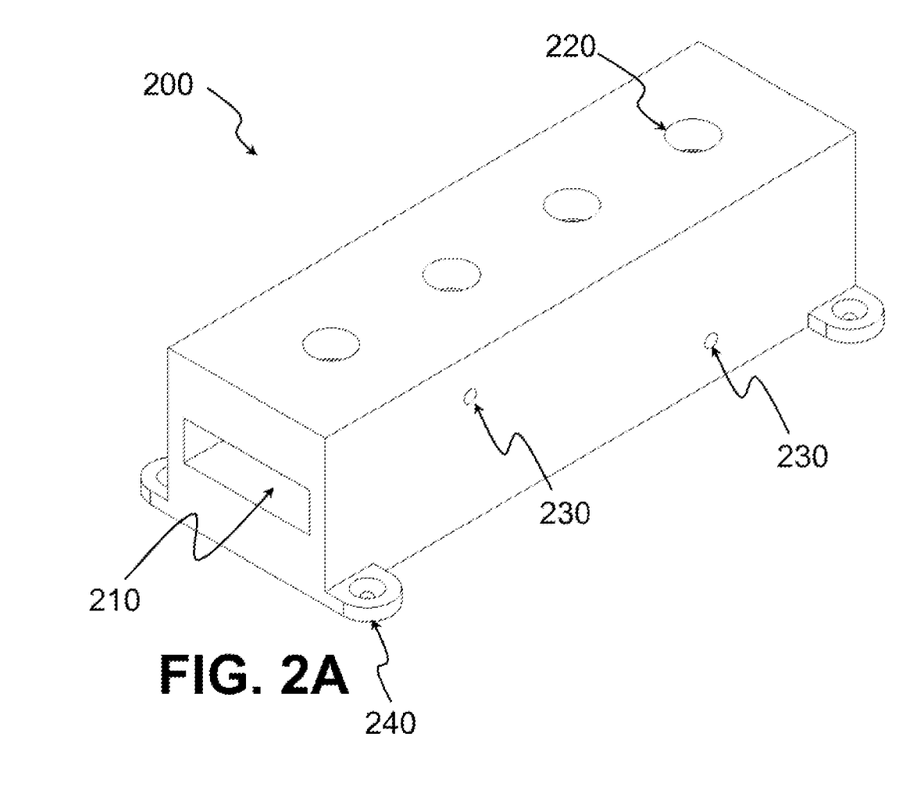
FIG. 2A shows a model of the manifold.
Figure 2B:
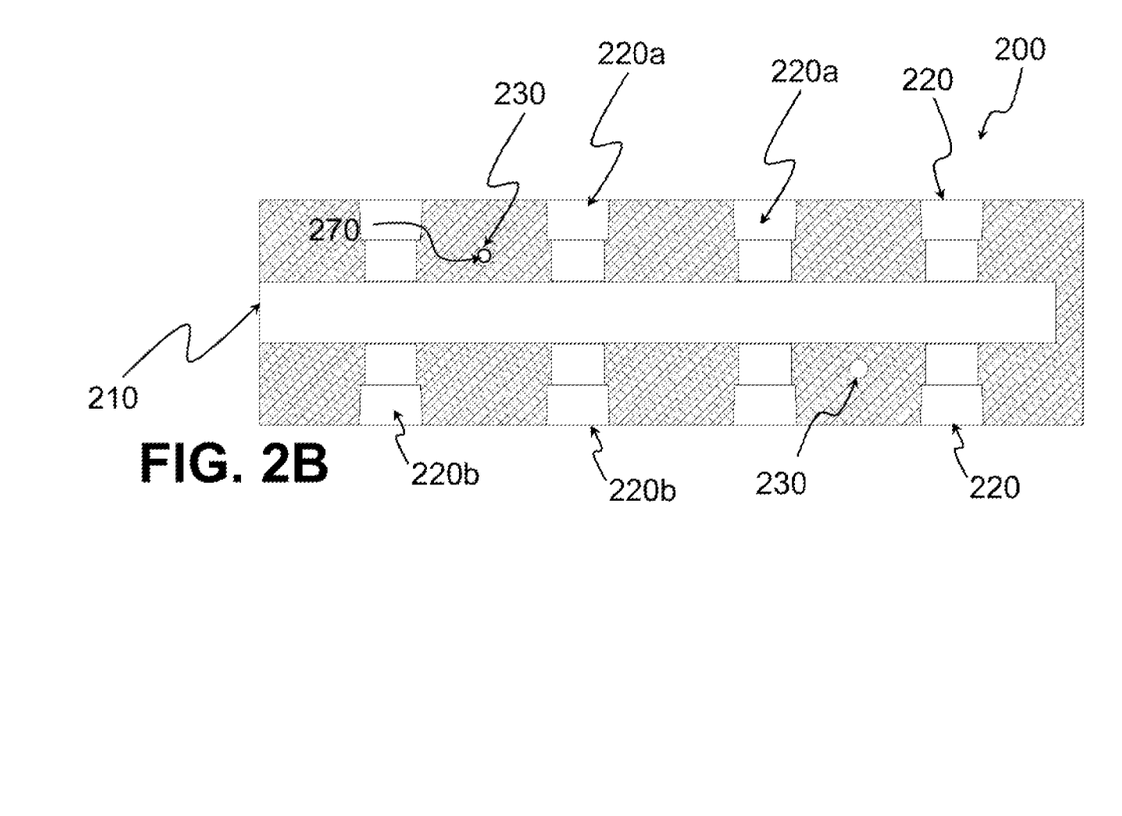
FIG. 2B depicts a sectional view of the model depicted in FIG. 2A.
Figure 5:
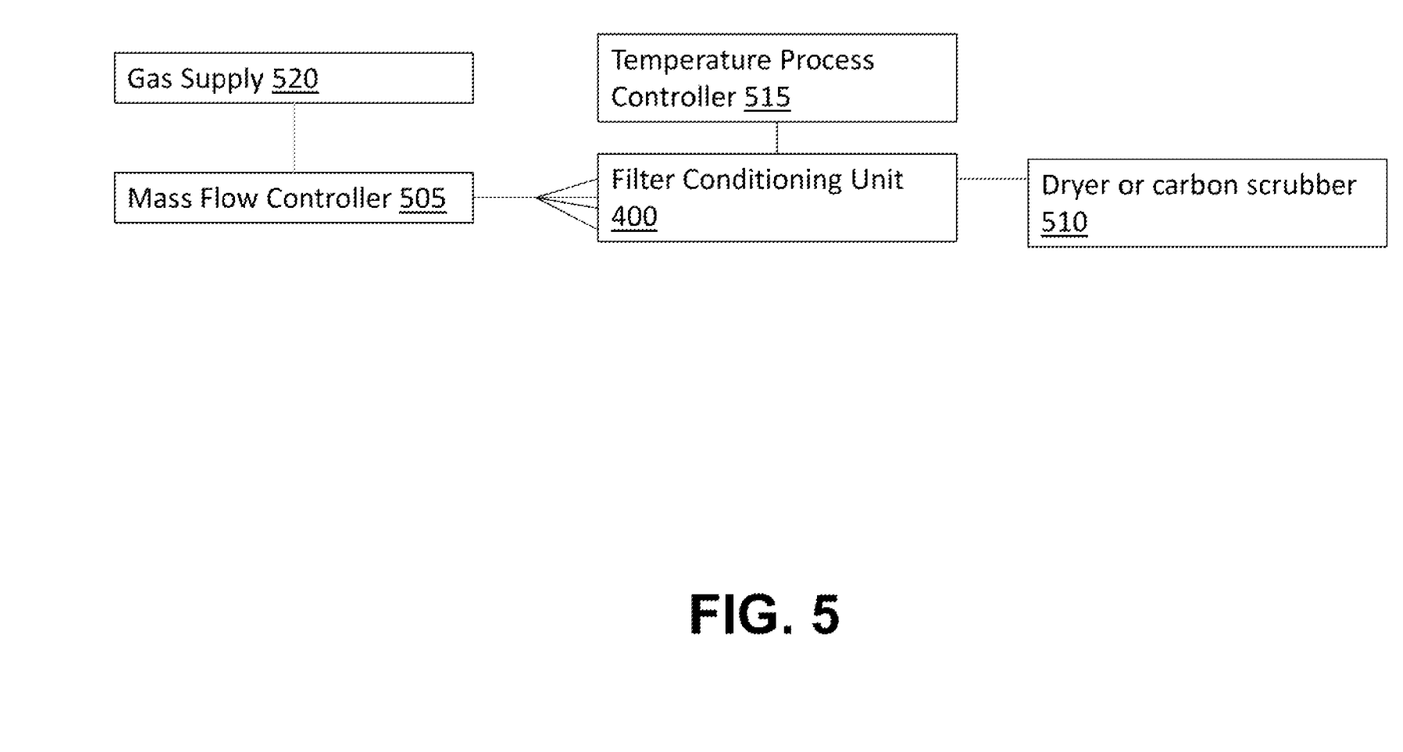
FIG. 5 is a schematic diagram of a system as disclosed herein.

An exemplary embodiment of a manifold 200 is depicted in FIGS. 2A-B. With reference to FIGS. 1 and 2A-B, the manifold 200 can define an opening 210 configured to receive the first portion 110 of the filter tray 100. As shown, it is contemplated that the shape and dimensions of the opening 210 can be complementary to the cross-sectional shape and dimensions of the first portion 110 of the filter tray. The manifold 200 can further define a plurality of holes 220. Each hole 220 can be configured to provide communication to one of a gas source 520 (FIG. 5) or an exhaust outlet. As shown in FIG. 2B, manifold 200 can define a plurality of inlet holes 220a above the opening 210 and a plurality of outlet holes 220b below the opening 210. The plurality of inlet holes 220a can be in communication with the gas source 520, which can provide a gas, such as, for example and without limitation, a purge gas. For example, a plurality of inlet lines 250 can provide fluid communication from the gas source to the inlet holes 220a. Accordingly, a purge gas or other vapor can pass through the plurality of cavities 130 of the filter tray 100 that hold one or more HVS filters. The outlet holes 220b can be in communication with respective exhaust lines 255. When the filter tray 100 is inserted into the manifold 200, the plurality of holes 220 of manifold 200 can be configured such that each of the holes 220 align with a respective cavity 130 of the plurality of cavities of the filter tray 100. That is, a respective inlet hole 220a and a respective outlet hole 220b can align with each cavity 130 so that fluid is communicated therethrough from the inlet hole, through the respective cavity, to the outlet hole. Although the embodiment depicted in FIGS. 2A-B includes four holes both above and below opening 210, other embodiments (with more or fewer inlet and outlet holes) are contemplated. For example, a respective inlet hole 220a and a respective outlet hole 220b can be provided for each cavity 130 of the filter tray.

According to one aspect, holes 220 can define one or more threads (e.g., the holes 220 can be tapped) to enable a coupling (optionally, a sealed coupling) to a respective gas line 250 (that is in communication with the gas source 520) or a respective exhaust line 255. In some aspects, connectors 260 (e.g., optionally, SWAGELOK connectors) can be threaded into the holes 220 defining one or more threads. Suitable tubing (e.g., ¼ inch PTFE or stainless steel tubing) or other conduit can be coupled to each connector. The tubing or other conduit can be in fluid communication with a gas supply such as a purge gas source or other gas source to define an inlet gas line 250. Similarly, the tubing or other conduit can define an exhaust line 255. According to one aspect, for example, tubing from the connectors of the plurality of holes 220 can be in communication with a mass flow controller 505 (FIG. 5) for controlling the purge gas (or other gas). In further aspects, the outlet gas line 255 can be in communication with a carbon scrubber for scrubbing gas exhausted from the manifold 200.

The manifold 200 can be made from a material suitable for withstanding temperatures required to clean and condition HVS filters. According to one aspect, the manifold 200 can be machined out of a suitable aluminum or aluminum alloy material (e.g., aluminum 6061). Other suitable materials that are machinable and allow for uniform heat transfer, such as stainless steel, are also contemplated. The manifold 200 can be insulated with a suitable insulating material, such as fiberglass. According to one aspect, for example, manifold 200 can be enclosed in fiberglass insulation to maintain temperature uniformity and shield users from potential injury.

The manifold 200 can also define one or more cavities 230 configured to receive a heating element, such as a cartridge heater. As shown in FIGS. 2A-B, for example, manifold 200 can define a plurality of cavities 230 configured to receive a heating element 270 (e.g., a cartridge heater). The cavities 230 can provide minimal clearance (e.g., less than 0.005 inches, less than 0.003 inches, or about 0.001 inches) to allow for thermal communication from the heating elements. In some optional aspects, a thermally conductive material (e.g., a paste) can be disposed between the heating element and the respective cavity to facilitate heat transfer. The plurality of cavities 230 can be placed in positions of manifold 200 to ensure uniform heating of the filter tray comprising the HVS filters. This allows for the entire manifold to be uniformly heated during operation. Optionally, as shown in FIG. 2B, the cavities 230 can optionally be oriented perpendicular (or within 15 degrees, with 10 degrees, within 5 degrees, or within 1 degree of perpendicular) to an orientation of the openings 220. In some exemplary aspects, an equal number of cavities 230 can be positioned above and below opening 210 to contribute to uniform heating.

According to one aspect, manifold 200 also comprises one or more offset tabs 240 that extend outwardly from outer (e.g., side) edges of the manifold. Tabs 240 can be connected to stand offs. Offset tabs 240 can be useful for minimizing heat transfer from the manifold to the insulating enclosure. As described below, the stand offs connected to offset tabs 240 can be further supported by a base that supports manifold 200 and the enclosure surrounding it.

D. Enclosure

Optionally, the filter conditioning unit can comprise an enclosure that surrounds the manifold but that allows for gas, exhaust, or cartridge heater lines to connect to the manifold. The enclosure can be useful both for keeping the user and other personnel safe from the high temperatures utilized to condition HVS filters. The enclosure can be made from a suitable material such as custom aluminum sheet metal.

Figure 3A:
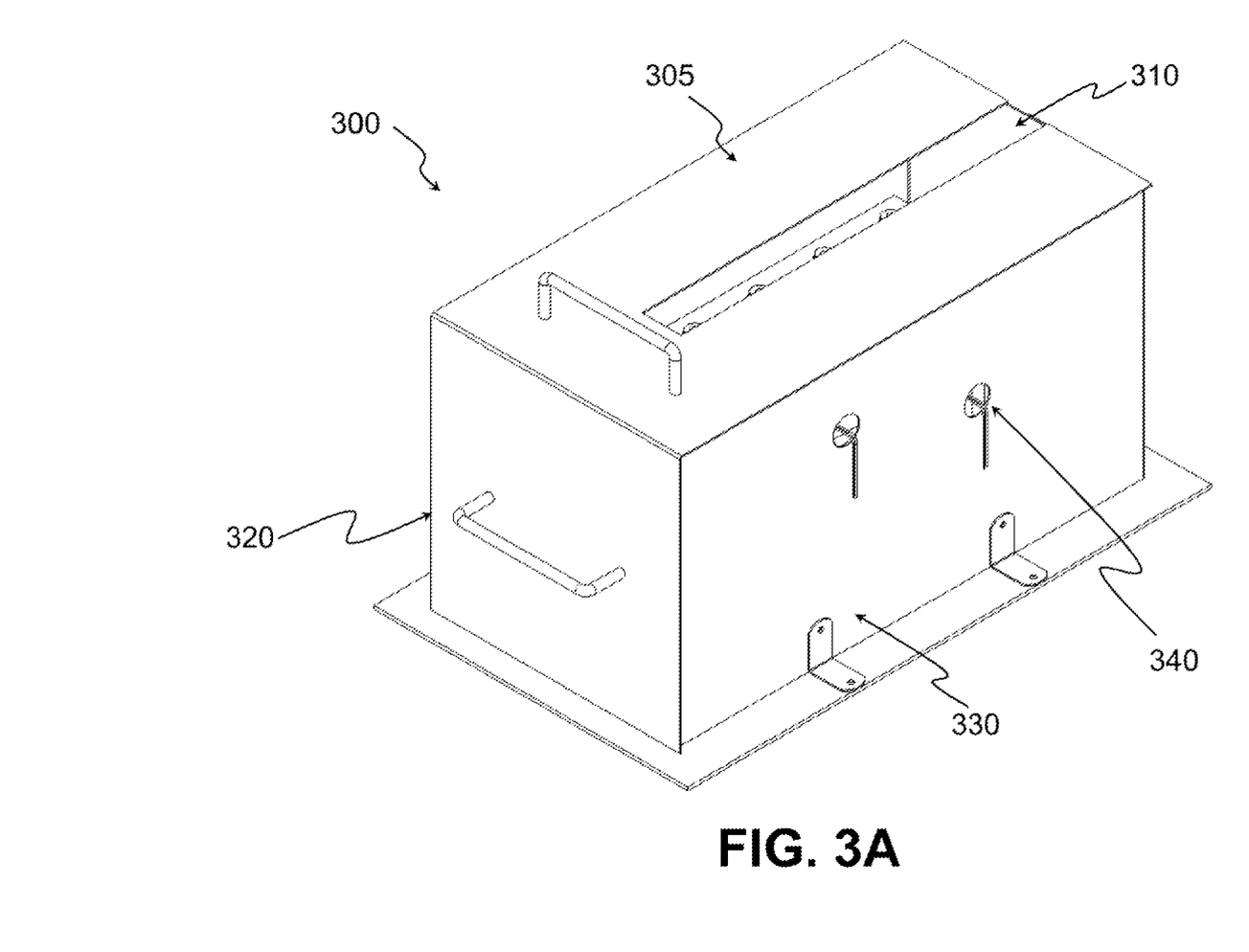
FIG. 3A depicts an exemplary embodiment (frontal perspective view) of an enclosure for the filter conditioning unit.

According to one aspect, with reference to FIG. 3A, enclosure 300 can comprise a top 305, sides 330, a front 320, and a back. Top 305 can define opening 310 which can generally align with (in overlying relation to) the plurality of openings of the manifold that are configured to receive a gas or exhaust line. One or more sides 330 can define one or more openings 340 configured to receive a cartridge heater line for the cartridge heaters present in the manifold. In exemplary aspects, each opening 340 can be positioned in alignment with a respective cavity 230 of the manifold 200. As shown in FIG. 3A, enclosure 300 can further comprise one or more handles for conveniently moving the enclosure. Enclosure 300 can also comprise a base plate attached to the respective side and/or back and front of the enclosure to keep the manifold in place.

Figure 3B:
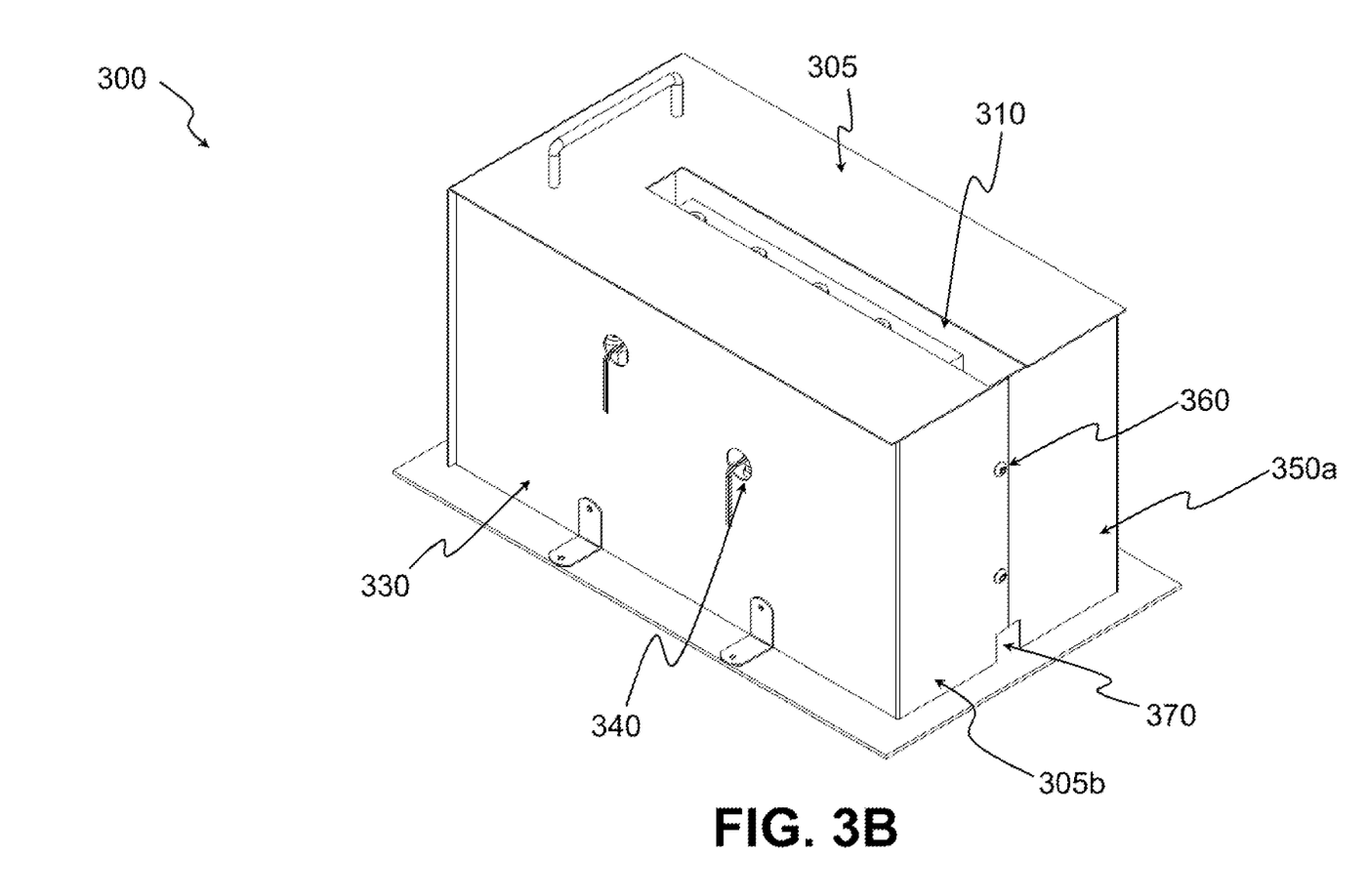
FIG. 3B depicts a rear perspective view of an exemplary embodiment of the enclosure.

With reference to FIG. 3B, enclosure 300 can comprise a back that includes two overlapping back panels (350a and 350b). Overlapping back panels 350a and 350b can be secured together with fasteners 360, such as, for example, commercial off-the-shelf (COTS) nuts and bolts, rivets, screws, or other suitable fasteners. The two back panels 350a and 350b, when secured together, can define a cutout 370 that allows exhaust tubing to exit the enclosure to a dryer or carbon scrubber.

E. Assembled Filter Conditioning Unit and Method of Using the Unit

Figure 4:
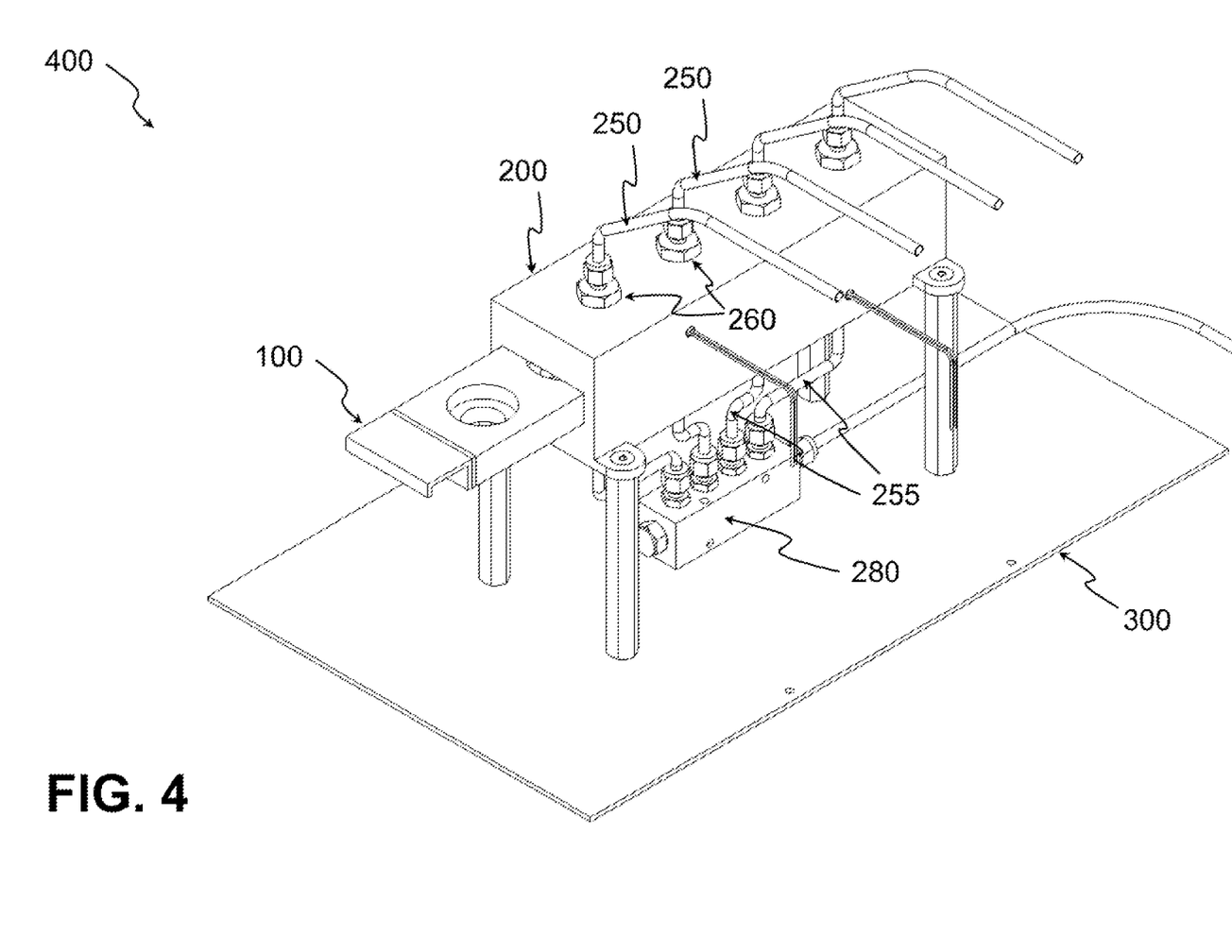
FIG. 4 depicts an exemplary embodiment of an assembled filter conditioning unit without the enclosure.

FIG. 4 depicts an exemplary embodiment of the filter conditioning unit 400 without the full enclosure shown (only the base of the enclosure is shown). As shown in FIG. 4, the filter tray 100 can be inserted into the opening of the manifold 200. The manifold of FIG. 4 features holes on the top of the manifold configured to receive a gas or exhaust line (inlet gas lines 250 with associated connectors 260 shown). The holes can be tapped holes, which can connect to connectors (e.g., SWAGELOK connectors) leading to a mass flow controller 505 (FIG. 5) via suitable tubing such as plastic or polymer (e.g., PTFE) tubing, metal (e.g., stainless steel) tubing, or other tubing. Holes in the bottom of the manifold can also feature tapped holes, again connected to lines (exhaust lines 255 shown) via connectors (e.g., SWAGELOK connectors). The exhaust lines leading from the bottom of the manifold can lead to a second manifold 280 (optionally, a COTS manifold), which can be connected to a dryer or carbon scrubber. The embodiment depicted in FIG. 4 includes a manifold secured to a base via stand offs secured to the offset tabs located at the corners of the manifold. Cartridge heaters can be received through one or more sides of the manifold as shown in FIG. 4.

According to one aspect, to condition one or more IVS filters using the filter conditioning unit, there are two principal controls, the temperature control and the gas flow control. The manifold can be heated to the desired temperature via one or more embedded cartridge heaters. Cartridge heaters can be controlled through a feedback loop using a temperature sensor, (e.g., a thermocouple or a resistive temperature detector (RTD) probe) and temperature process controller 515 (FIG. 5), for example.

For filter conditioning and cleaning, the temperature of the filter conditioning unit can generally be set at a temperature higher than that of filter desorption. After the unit has reached temperature, filter media can be placed inside the cavities of the filter tray, and the tray can be loaded inside the opening of the manifold. The tray can be inserted completely (i.e., until it bottoms out) to ensure that the cavities align with the manifold's inlet and outlet connections as well as ensuring an airtight seal against the manifold.

In addition to heating, the filters can be purged with clean air (e.g., nitrogen) to push any particulates or thermal desorption products off the filter media and to the exhaust. According to one aspect, the tapped holes with SWAGELOK connections and PTFE tubing on top of the manifold can be connected to mass flow controllers to control the flow rate of the purge gas to each of the cavities. The gas can be heated inside the manifold body flowing through the filters and can exit through the bottom ports of the manifold. Any vapor compounds in the output gas can be scrubbed clean via the carbon trap before the gas is reintroduced into the local (e.g., ambient) environment surrounding the filter conditioning unit.

Although embodiments herein are disclosed for use with HVS filters, it is contemplated that other filters can be conditioned using the disclosed apparatuses, systems, and methods disclosed herein. Optionally, in exemplary aspects, it is contemplated that a plurality of filters of different types can be simultaneously conditioned using the disclosed apparatuses, systems, and methods disclosed herein.

Those skilled in the art will recognize, or be able to ascertain using no more than routine experimentation, many equivalents to the specific embodiments of the filter conditioning unit and method described herein. Such equivalents are intended to be encompassed by the following claims.

What is claimed is:
1. A filter conditioning unit comprising:
   a. a filter tray defining a plurality of cavities extending therethrough, each cavity being configured to receive and support one or more filters; and
   b. a manifold defining an opening configured to receive at least a portion of the filter tray, wherein the manifold further defines a plurality of inlet holes each configured to receive a gas source and a plurality of outlet holes each configured to receive an exhaust line, each of the plurality of inlet holes and outlet holes being aligned with a respective cavity of the plurality of cavities of the filter tray when the tray is received within the manifold, and wherein the manifold further comprises one or more cavities configured to receive a heating element.

2. The conditioning system of claim 1, wherein each cavity of the plurality of cavities comprises a through bore and a recess that defines a lip upon which the one or more filters are configured to rest.

3. The filter conditioning unit of claim 1, further comprising:
an enclosure configured to receive the manifold; and
at least one spacer that is coupled to the manifold, wherein the at least one spacer is configured to maintain the manifold in a spaced relationship from the enclosure.

4. The filter conditioning unit of claim 1, further comprising a sealing element that is configured to form a seal between the filter tray and the opening of the manifold.

5. The filter conditioning unit of claim 1, wherein the filter tray defines a handle that is configured to extend from the manifold when the filter tray is received within the opening of the manifold.

6. A system comprising:
 a. a gas source; and
 b. a filter conditioning unit, comprising:
  i. a filter tray defining a plurality of cavities extending therethrough, wherein one or more filters are disposed within each cavity of the filter tray;
  ii. a manifold defining an opening that is configured to receive at least a portion of the filter tray, wherein the filter tray is at least partially received within the opening, wherein the manifold further defines a plurality of inlet holes in communication with the gas source and a plurality of outlet holes in communication with respective exhaust lines, each of the plurality of inlet holes and outlet holes being aligned with a respective cavity of the plurality of cavities of the filter tray received within the manifold, and wherein the manifold further defines one or more cavities; and
  iii. a respective heating element disposed within each cavity of the manifold.

7. The system of claim 6, further comprising:
an enclosure at least partially surrounding the manifold; and
at least one spacer that is coupled to the manifold, wherein the at least one spacer is configured to maintain the manifold in a spaced relationship from the enclosure.

8. The system of claim 6, wherein each cavity of the plurality of cavities comprises a through bore and a recess that defines a lip upon which the one or more filters are configured to rest.

9. The system of claim 6, further comprising at least one of a dryer or a carbon scrubber in communication with the exhaust lines.

10. The system of claim 9, wherein the manifold is a first manifold, the filter conditioning system further comprising a second manifold defining a plurality of inlets and an outlet, wherein each of the exhaust lines is in communication with a respective inlet of the plurality of inlets of the second manifold, wherein the outlet of the second manifold is in communication with the at least one of the dryer or the carbon scrubber.

11. The system of claim 6, further comprising a mass flow controller in communication with the gas source, wherein the mass flow controller is configured to control the flow of inlet gas to the plurality of inlet holes.

12. A method comprising:
 a. positioning at least one filter into each cavity of a plurality of cavities of a filter tray, wherein each cavity of the plurality of cavities extends through the filter tray;
 b. positioning the filter tray at least partially within an opening of a manifold so that each of a plurality of inlet holes and a plurality of outlet holes of the manifold are aligned with a respective cavity of the plurality of cavities of the filter tray, wherein the manifold further defines one or more cavities, and wherein a heating element is disposed within each cavity of the manifold.

13. The method of claim 12, further comprising delivering gas from a gas source to the plurality of inlet holes.

14. The method of claim 12, further comprising heating the manifold to a predetermined temperature with the heating element disposed within each cavity of the manifold.

15. The method of claim 14, further comprising maintaining the temperature within the manifold.

16. The method of claim 12, further comprising: delivering the gas from the outlet holes to at least one of a dryer or a carbon scrubber.

17. The method of claim 16, further comprising venting the gas from the at least one of the dryer or the carbon scrubber to an ambient environment.

18. The method of claim 12, further comprising enclosing the manifold within an enclosure.

19. The method of claim 12, wherein positioning at least one filter into each cavity of the plurality of cavities of the filter tray comprises positioning a plurality of filters in each cavity of the plurality of cavities of the filter tray.

* * * * *